United States Patent Office 3,050,571
Patented Aug. 21, 1962

3,050,571
SELECTIVE CONVERSION OF COS IN THE PRESENCE OF A NON-ACETYLENIC UNSATURATED HYDROCARBON GAS
Harold W. Fleming and William R. Gutmann, Louisville, Ky., assignors to Catalysts and Chemicals Inc., Louisville, Ky., a corporation of Delaware
No Drawing. Filed Oct. 13, 1958, Ser. No. 766,712
5 Claims. (Cl. 260—677)

This invention concerns an improved method for purifying olefins which are contaminated with organic sulfur compounds. More specifically, this invention is concerned with the selective catalytic conversion of organic sulfur compounds in olefin streams with little or no destruction of the olefins.

One of the usual methods for manufacturing olefins comprises passing mixtures such as refinery gas, kerosene, naphtha, or gas oil through a reactor heated sufficiently to decompose such materials with the formation of hydrogen and one or more unsaturated compounds. Pyrolyses of this type have been carried out at temperatures ranging from about 500° C. to about 1200° C. with the yield of olefin products per pass being highest at temperatures above 600° C. Within this temperature range the more stable sulfur compounds are hydrogen sulfide and carbonyl sulfide which are usually found in a ratio of about 10/1. The former compound, that is, hydrogen sulfide, is acid in character and can, therefore, be easily removed by conventional scrubbing techniques using caustic or amine solutions. However, carbonyl sulfide is refractory in nature and is essentially inert chemically so that it can not be removed by scrubbing. As a consequence, carbonyl sulfide and other related organic sulfur compounds must be first converted to a more chemically acid form such as hydrogen sulfide to effect satisfactory separation thereof from the gas composition.

The demand for high polymeric plastics has greatly increased since World War II and more especially since 1950. For example, polypropylene is now in commercial production both in U.S. and in Europe and in certain instance possesses properties which makes its application superior to poly ethylene. This material has created a demand for propylene of extreme purity, containing organic sulfur compounds in concentrations of less than 10 p.p.m. The problem of removal of organic sulfur compounds, such as carbonyl sulfide, in the purification of ethylene was not extremely serious since the majority of the sulfur was removed with the propylene fraction. However, both carbonyl sulfide and propylene have a boiling point of about −50° C., which renders separation by fractionation essentially impossible. Thus, propylene separated from pyrolysis mixtures by conventional procedure will contain high percentages of carbonyl sulfide which must be reduced to a concentration of about less than 10 p.p.m to be suitable for the production of plastics. It has also been found in the production of Oxo alcohols suitable for the production of plasticizers that minute amounts of sulfur compounds present in the olefin feed are responsible for the color forming tendencies of the alcohol product. This is particularly true in the feed to the polymerization zone in which the $C_3$ and $C_4$ streams are co-polymerized. The feed streams frequently have sulfur contents of 0.1% and higher and in the prior art where these polymerized hydrocarbons were to be used as gasoline with or without a subsequent hydrogenation treatment, it was sufficient to reduce the sulfur level to, say, 0.03–0.08%. It has now been determined that sulfur in amounts as low as 20 p.p.m., or .002% in the finished alcohol product is sufficient to make the latter completely unstable for esterification processes. In general, the entire content of the sulfur which is present in the synthetic Oxo alcohols is in the form of organically combined sulfur. Although the exact type of organic impurity in which the sulfur occurs has not been fully determined, in general it is deleterious in all forms.

It is an object of this invention, therefore, to provide a process for the removal of carbonyl sulfide produced incident to the production of olefins without concomitant destruction of olefins. An other object of this invention is to provide catalysts which are selective in their action in converting carbonyl sulfide without appreciably affecting the nature or the quantity of olefins in the treated gas. Other important objects will be apparent to those skilled in the art by reference to the following description of our invention.

We have found that a gas composition, which contains a substantial amount of mono olefins and diolefins and as impurities incident to the manufacture of said gas composition carbonyl sulfide, may be purified without substantially altering the quality or quantity of said olefinic and diolefinic constituents by catalytically converting said carbonyl sulfide to compounds more amenable to separation by conventional agents such as active carbon, caustic or amines. More specifically we have invented a process whereby the carbonyl sulfide of said gas composition is selectively converted by passing, with hydrogen, said gas composition, saturated with water vapor at a pressure in the range of about one to forty atmospheres and a temperature in the range of about 350° to 650° F., over a catalyst which comprises the oxides or sulfides of copper or iron separately or in combination with the oxides or sulfides of the metals of the left-hand side of group 6 of the periodic table, these latter being specifically the oxide or sulfide of chromium or molybdenum. In view of the many catalysts which have been prepared for the conversion of organic sulfur compounds, it is surprising that the catalysts of this invention, alone, are selective for the conversion of carbonyl sulfide in that the carbonyl sulfide is essentially completely converted without affecting the olefinic constituents appreciably.

While we do not wish to be bound by any hypothesis or theory as to the mechanism of the reaction, we have noticed that the gases to be treated must be saturated with water vapor in order to obtain the desired degree of conversion. However, we have operated at pressures in excess of 350 p.s.i.g. wherein the water vapor is present in a concentration of less than 0.2% (saturated at room temperature). Further we have increased the concentration of steam to as high as 20% in the process gases; but having obtained essentially complete conversion at the lower steam levels (i.e. 0.2%), the only observation which could be made was that the excess steam was not detrimental. Since most industrial gases are saturated with water vapor, and removal thereof constitutes an added expense, its presence in such concentrations is beneficial. On the other hand, gases containing more than—say—5% steam are not normally available and increasing the steam to a level in excess of this is economically unattractive. The process of our invention operates effectively with steam concentrations of from about 0.1% to about 5%, i.e. concentrations normally available in most industrial applications. It is, of course, within the scope of this invention to add steam to the process gas which may be desired if the process is operated at highly elevated pressures. It is apparent that two reactions are possible viz:

Hydrogenation

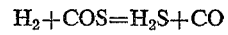
$$H_2 + COS = H_2S + CO$$

or

Hydrolysis

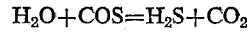
$$H_2O + COS = H_2S + CO_2$$

We have found that for the most part little or no $H_2S$ appears in the effluent gases which indicates that some of the H₂S reacts with the olefin to form a mercaptan viz:

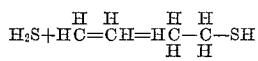

This is of little import, however, since mercaptans are effectively removed from gases by adsorption on activated carbon or by fractionation. Further when either iron oxide or copper oxide is utilized as the catalyst the sulfur is taken up by the catalyst until it is completely saturated. However as will be shown in the examples previously sulfided iron oxide and copper oxide are active for the reaction so that the sulfur capacity of the catalyst is not a controlling factor of the process. We have not yet been able to determine conclusively whether the predominant reaction is one of hydrogenation or hydrolysis. We do know, however, that utilizing the catalysts of this invention under the specified conditions carbonyl sulfide can be essentially completely converted to a form suitable for efficient separation from a gas composition comprising olefins and diolefins with essentially no loss of the latter valuable constituents.

The invention may be better understood by reference to the following examples.

*Example 1*

A catalyst containing on the final basis 6.8% copper oxide and 8% chromium oxide on activated alumina was prepared by dipping calcined alumina tablets in an aqueous solution of copper nitrate and chromic acid. After drying and calcination, 25 cc. of these tablets were loaded into an isothermal reactor which comprised an iron pipe with catalyst support grids, jacketed with a Dowtherm jacket. A gas mixture of the following composition:

| | |
|---|---|
| Ethylene | percent 63 |
| Butadiene | do 5 |
| Butylene | do 10 |
| Methane | do 10 |
| Hydrogen | do 10 |
| Ethane | do 2 |
| Carbonyl sulfide [1] | p.p.m. 925 |

[1] Saturated with water, i.e. about 0.2%.

was passed through the reactor at a temperature in the range of 490–550° F., a pressure of 175 p.s.i.g. and a space velocity varying from 800 to 2000. Space velocity is defined as the volumes of gas passed over a volume of catalyst per hour at standard temperature and pressure. There was no loss of either the butadiene or ethylene and there was no leakage of COS during a 5 day run.

*Example 2*

A catalyst comprising about 85% Fe₂O₃ and 15% Cr₂O₃ was prepared by the coprecipitation of ferrous sulfate and sodium dichromate by the addition of caustic. 25 cc. of the catalyst was placed in a reactor and tested under the same conditions of temperature and pressure as in Example 1. At a space velocity of 1000 there was no loss of either ethylene or butadiene and the COS leakage was in the range of 0–3 p.p.m. At a space velocity of 8000 the COS leakage was in the range of 5–10 p.p.m.

*Example 3*

A catalyst containing on a final basis 11% copper thiomolybdate (CuMoS₄) was prepared by dipping calcined alumina tablets in an ammoniacal impregnating solution consisting of equal molar quantities of copper nitrate and ammonium molybdate. The impregnated tablets were then dried at 110° C. and sulfided by the addition of concentrated H₂S. 25 cc. of this catalyst was tested with the gas mixture and with the reactor described in Example 1. At a space velocity of 1000 and a temperature of 445° F. there was no destruction of either the butadiene or ethylene but there was a leakage of COS in the range of 76–82 p.p.m. Upon raising the temperature to 515° F. about 2% of the ethylene was destroyed and the COS leakage was in the range of 0–3 p.p.m.

*Example 4*

A catalyst containing on a final basis 3.44% copper oxide on activated alumina was prepared by dipping calcined alumina in an impregnating solution comprising copper nitrate. The impregnated tablets were dried and sulfided by passing concentrated H₂S over said catalyst at a temperature of 600° F. 25 cc. of this catalyst was tested with the gas composition and reactor of Example 1 and at the same pressure as that of Example 1. At a temperature of 370° F. and a space velocity of 5000 there was no loss of either ethylene or butadiene. There was a leakage of COS of about 430 p.p.m. On lowering the space velocity to 1000 the COS leakage was lowered to about 22 p.p.m. The temperature was raised to 400° F. and periodically raised in 10° increments to 540° F. At a space velocity of 1000 there was no loss of olefins or diolefins and the COS in the effluent was in the range of 0–3 p.p.m.

*Example 5*

A catalyst containging on a final basis 10.8% Fe₂O₃ supported on activated alumina was prepared by immersing calcined activated alumina tablets in an aqueous solution of iron nitrate. The calcined tablets were dried and then subjected at a temperature of 600° F. to concentrated H₂S. 25 cc. of these tablets were tested under the same conditions as those of Example 1. At a temperature of 370° F. and a space velocity of 1000 there was no loss of either ethylene or butadiene and the COS in the effluent was in the range of 0–3 p.p.m. The space velocity was raised to 2000 at which the COS leakage increased to 32 p.p.m. and at a space velocity of 5000 the COS leakage was almost 150 p.p.m. The temperature was then increased in increments of 50° to 400°, 450°, 500° and 540° F. At a space velocity of 1000 the COS leakage in each case was in the range of 0–3 p.p.m. There was no loss of olefins or diolefins except at the highest temperature of 540° F. at which the loss amounted to only 1.1%.

*Example 6*

A catalyst containing on a final basis 27.8% molybdenum disulfide (MoS₂) on activated alumina was prepared by immersing calcined alumina tablets in a saturated aqueous solution of ammonium molybdate. The impregnated tablets were then dried and treated at a temperature of 600° F. for two hours with concentrated H₂S until they were completely saturated. 25 cc. of these tablets were tested with the identical gas composition, pressure and reactor as described in Example 1. At a temperature of 510° F. and a space velocity of 1000 the COS leakage was in the range of 0–3 p.p.m.; however, 17% of the ethylene was destroyed. The space velocity was increased to 15,000 whereby the ethylene destruction was lowered to 2.5% but the COS leakage was over 200 p.p.m. The temperature was lowered in about 50° increments and finally at a temperature of 365° F. and a space velocity of 1000 the ethylene loss was cut to 2.1% but there was still a COS leakage of over 90 p.p.m.

*Example 7*

A catalyst containing on a final basis 15% Cr₂O₃ on activated alumina was prepared by dipping activated alumina tablets in an aqueous chromic acid solution. The impregnated tablets were dried and calcined at about 900° F. for about 8 hours. 25 cc. of these tablets were tested under the conditions of Example 1 except that 6% steam was added to the gas mixture. At a temperature of 450° F. and a space velocity of 800 the COS leakage was in the range of about 120 p.p.m. Raising the temperature to 470° F. brought the COS leakage to about 105 p.p.m. On the following day the temperature was raised to 540° F. and with the space velocity remaining constant the COS leakage was in the range of 340–400 p.p.m. The temperature was then raised to 600° F. and the space velocity cut to the 400 and the leakage of COS was still over 200 p.p.m.

*Example 8*

A catalyst containing on a final basis 3.2% nickel sulfate and 14.5% chromium oxide was prepared as follows. Tableted activated alumina was immersed in an aqueous solution of chromic acid, dried and calcined. After cooling the calcined tablets were dipped in an aqueous solution of nickel sulfate, dried and calcined at a temperature of 900° F. for 8 hours. 25 cc. of this catalyst was charged to the reactor described in Example 1. The catalyst was then reduced with hydrogen at a temperature of 750° F. for 12 hours. The gas composition of Example 1 was then passed over the catalyst at a pressure of 175 p.s.i.g. and an initial temperature of 500° F. At a space velocity of 1000 all of the COS was removed; however 20% of the ethylene was hydrogenated. The temperature was lowered to 450° F. but over 11% of the ethylene was destroyed. The temperature was lowered to 360° F. The COS in the effluent jumped to 98 p.p.m. and over 6% of the ethylene was lost. The space velocity was raised to 10,000; however, 4% of the ethylene was hydrogenated and the COS leakage jumped to 208 p.p.m.

*Example 9*

A catalyst containing on a final basis 2.9% nickel, 0.53% cobalt and 0.07% chromium (as metals) supported on a low surface area refractory (about 1 m.²/gm. as compared with about 250-300 m.²/gm. of the preceding example) was prepared as follows. An aqueous solution of nickel nitrate, cobalt nitrate and chromic acid was prepared and sufficient sulfuric acid added thereto to convert all the salts to the sulfate. The shaped refractories were immersed in said solution and upon removal were dried and calcined at 900° F. for about 8 hours. 25 cc. of this catalyst was loaded to the reactor and reduced with hydrogen at 750° F. for 12 hours. The catalyst was then tested with the gas composition of Example 1 at a pressure of 175 p.s.i.g., an initial temperature of 500° F. and a space velocity of 800. At this temperature there was no loss of ethylene; however, the leakage of COS was 670 p.p.m. The temperature was raised to 530° F. but still the COS leakage was in excess of 500 p.p.m.

It will be noted after review of the above examples that of the easily reducible metals, i.e. iron, cobalt, nickel and copper, which have atomic numbers of 26, 27, 28 and 29 respectively, only catalysts containing the oxides and sulfides of iron and copper were truly selective in this process. Chromium oxide by itself was not sufficiently active unless an excessive amount of steam was added. However, chromium oxide in combination with the oxides of iron and copper respectively showed excellent activity and selectively. Molybdenum disulfide, on the other hand, was much too active and hydrogenated the olefins excessively when complete conversion of the carbonyl sulfide was obtained. When the molybdenum disulfide catalyst was made selective for the olefins, incomplete carbonyl sulfide conversion was obtained. Copper thiomolybdate, on the other hand, was quite active and selective. Nickel sulfide on a high surface area support behaved in a manner similar to molybdenum disulfide. Essentially the same catalyst on a low surface area support, although selective toward the olefins, was not sufficiently active in converting the carbonyl sulfide.

Still other variations may be made in the process of our invention which is not limited to the examples described by illustration nor by any theory proposed in explanation of the results obtained.

We claim:

1. A process for the conversion of carbonyl sulfide in a gas composition containing a substantial proportion of non-acetylenic, normally gaseous, unsaturated hydrocarbons whereby the carbonyl sulfide is substantially completely converted without appreciable loss of said unsaturated hydrocarbons, which comprises the step of passing said gas composition, saturated with water vapor at atmospheric temperature and at a pressure in the range of from about 1 to 40 atmospheres, with hydrogen at a temperature in the range of about 350° to about 650° F. over a catalyst comprising a metallic catalytically active constituent for converting said carbonyl sulfide which is inactive towards said unsaturated hydrocarbons, said constituent being selected from the group consisting of the oxides and sulfides of copper and iron being present in a concentration by weight of from 2 to 10% together with chromium oxide in a concentration by weight of from 2 to 15% on a carrier having a surface area in the range of from 100 to 600 m.²/gm.

2. The process of claim 1 in which the catalyst comprises iron oxide and a compound selected from the group consisting of a metal sulfide and metal oxide the metal of said oxide and sulfide being selected from the group consisting of molybdenum and chromium.

3. The process of claim 1 in which the catalyst comprises copper oxide and a compound selected from the group consisting of a metal sulfide and metal oxide the metal of said oxide and sulfide being selected from the group consisting of molybdenum and chromium.

4. The process of claim 1 in which the catalyst contains as the main catalytically active constituent copper sulfide.

5. The process of claim 1 in which the catalyst contains as the main catalytically active constituent iron sulfide.

References Cited in the file of this patent

UNITED STATES PATENTS

| | | |
|---|---|---|
| 1,757,826 | Bannister | May 6, 1930 |
| 1,812,527 | Gross et al. | June 30, 1931 |
| 2,298,347 | Carson et al. | Oct. 13, 1942 |
| 2,843,639 | Langlois et al. | July 15, 1958 |
| 2,851,504 | Hogan | Sept. 9, 1958 |